Nov. 26, 1929.   V. W. MORAY   1,737,168

PISTON RING

Filed July 10, 1926

INVENTOR.
Virgil W. Moray
BY Daniel L. Morris.
ATTORNEYS.

Patented Nov. 26, 1929

1,737,168

UNITED STATES PATENT OFFICE

VIRGIL W. MORAY, OF NEW YORK, N. Y.

PISTON RING

Application filed July 10, 1926. Serial No. 121,529.

The invention relates to improvements in piston rings for use in connection with internal combustion engines and other heat engines, compression or suction machines, employing a piston.

The principal object of the invention is to provide a piston ring which is cheap to manufacture, which may be easily applied to the piston, which is very effective in preventing leakage of gas past the piston when in operation, and which in addition provides a replaceable bearing surface for the piston.

A more specific object of the invention is to provide a piston ring so shaped that, on the operating stroke of the piston, it is urged into intimate frictional engagement with the walls of the cylinder and serves as a seal for preventing escape of gas between the piston and cylinder walls.

Another object of the invention is to provide, in combination with the piston ring, yielding or expanding means for maintaining the ring in engagement with the walls of the cylinder at all times.

A further and specific object of the invention is to provide a piston ring which is wedge-shaped in cross-section and which is split to enable it to be applied to the piston in an easy and simple manner and also to permit it to expand or contract so as to maintain a good frictional engagement with the cylinder walls.

The invention further resides in certain details of construction and combination of parts which will be obvious from the following description of the accompanying drawings forming part of this specification.

Figures 3 to 6 inclusive are views showing forms of springs preferably employed in connection with the piston rings.

The numeral 1 designates the walls of the engine cylinder, and the numeral 2 a connecting rod which transmits reciprocating motion of the piston into rotatory motion of a crank shaft.

Figure 1:
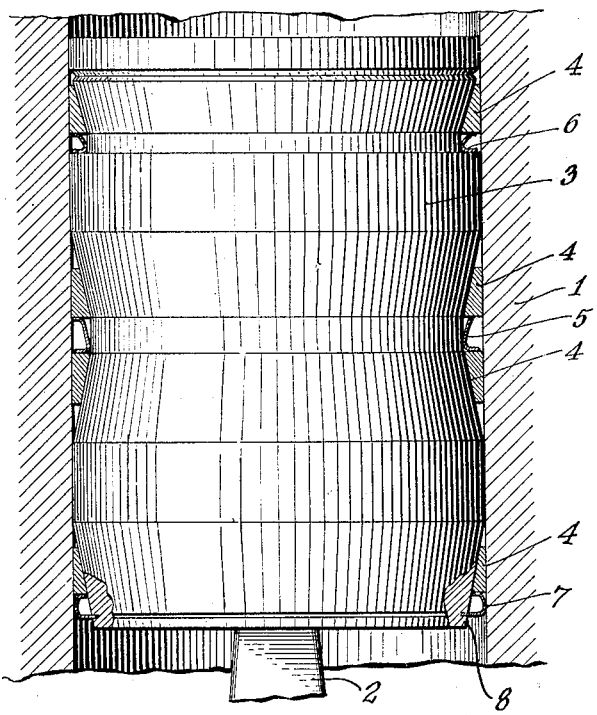
Figure 1 is a view showing a piston equipped with piston rings constructed in accordance with the principles of the invention.

The piston 3 is provided with a plurality of grooves adapted to receive the piston rings 4. The piston rings are constructed of any suitable material and are preferably wedge-shaped in cross-section. The grooves on the piston are tapered and shaped so as to receive the rings. In the preferred embodiment of the invention, I employ a plurality of rings and arrange them in the manner shown in Figure 1. It is obvious, however, that the number of rings and the arrangement may be varied without departing from the spirit of the invention.

A circular spring 5 which is preferably inwardly bowed and which is provided with a number of notches extending around its circumference for augmenting its resiliency is used in connection with the two middle rings, the function thereof being to urge the rings at all times into yielding intimate engagement with the walls of the cylinder. A similar, circular spring 6 is used in connection with the top end ring for the same purpose.

The lower end ring is also provided with a circular spring, 7, very similar to the springs, 5 and 6, only outwardly bowed, which spring is also notched to increase the resiliency. This spring is rigidly secured to the piston as indicated at 8.

Figure 2:
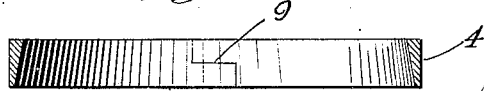
Figure 2 is a sectional view of the piston ring.
Figure 3:
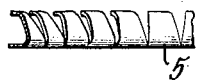
Figure 5:
Figure 4:
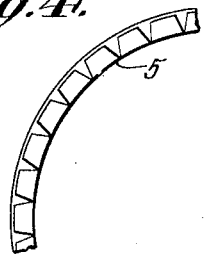
Figure 6:
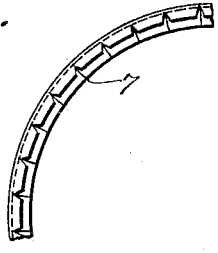

The rings and the springs are all split as indicated at 9 in Figure 2 to enable them to be readily applied to the piston and fitted in the grooves provided for them.

In operation, when the piston is on its downward stroke, the rings which taper upwardly due to their inertia and their friction against the cylinder walls together with the expansive action of the springs are urged into intimate frictional engagement with the walls of the cylinder and prevents leakage of gas between the piston and walls of the cylinder. Similarly, when the piston is on its upward stroke, the ring which tapers downwardly is urged into intimate frictional engagement with the walls of the cylinder. Thus on both the upward and downward strokes of the piston, the rings serve to prevent any leakage of gas between the piston and cylinder walls.

The particular shape of the rings employed is not essential as other shapes may be employed with similar results, but I prefer this shape because of its simplicity and the ease with which rings so shaped may be constructed. So also other shapes may be used for the springs although circular notched bowed springs of the types described are believed best suited for the purpose.

Many modifications and embodiments in the above described structure may be made without departing from the spirit of the invention and I desire to be limited only by the prior art and the scope of the appended claims.

What I claim is:

1. A piston comprising a body portion having a peripheral groove with an axially inclined surface, a wedge-shaped piston ring seated in said groove, and a bowed spring extending around the piston and adapted for cooperation with the end of the piston ring for urging said ring up the inclined surface, said spring acting uniformly on the piston ring around the periphery thereof.

2. A piston according to claim 1 wherein the spring is composed of sheet metal and is notched to add to its resiliency.

In testimony whereof, I have signed my name to this specification this 29th day of June, 1926.

VIRGIL W. MORAY.